US010970868B2

(12) United States Patent
Williams

(10) Patent No.: US 10,970,868 B2
(45) Date of Patent: Apr. 6, 2021

(54) COMPUTER-IMPLEMENTED TOOLS AND METHODS FOR DETERMINING OPTIMAL EAR TIP FITMENT

(71) Applicant: Bose Corporation, Framingham, MA (US)

(72) Inventor: Joshua Williams, Marlborough, MA (US)

(73) Assignee: Bose Corporation, Framingham, MA (US)

( * ) Notice: Subject to any disclaimer, the term of this patent is extended or adjusted under 35 U.S.C. 154(b) by 87 days.

(21) Appl. No.: 16/121,512

(22) Filed: Sep. 4, 2018

(65) Prior Publication Data
US 2020/0074662 A1 Mar. 5, 2020

(51) Int. Cl.
G06T 7/60 (2017.01)
H04R 1/10 (2006.01)
H04R 29/00 (2006.01)

(52) U.S. Cl.
CPC ............. G06T 7/60 (2013.01); H04R 1/1016 (2013.01); G06T 2207/20076 (2013.01); G06T 2207/20081 (2013.01); G06T 2207/20092 (2013.01); G06T 2207/30196 (2013.01); H04R 29/001 (2013.01); H04R 2420/07 (2013.01)

(58) Field of Classification Search
CPC combination set(s) only.
See application file for complete search history.

(56) References Cited

U.S. PATENT DOCUMENTS

| | | | |
|---|---|---|---|
| 9,894,452 B1* | 2/2018 | Termeulen | H04R 1/1041 |
| 10,034,078 B2 | 7/2018 | Silvestri et al. | |
| 2008/0137873 A1* | 6/2008 | Goldstein | H04R 1/1083 |
| | | | 381/57 |
| 2010/0296664 A1* | 11/2010 | Burgett | A61F 11/08 |
| | | | 381/67 |
| 2011/0116643 A1* | 5/2011 | Tiscareno | H04R 5/033 |
| | | | 381/58 |

(Continued)

OTHER PUBLICATIONS

Simple Image Classification using Convolutional Neural Network; Deep Learning in python; https://becominghuman.ai/building-an-image-classifier-using-deep-learning-in-python-totally-from-a-beginners-perspective-be8dbaf22dd8; Becoming Human: Artificial Intelligence Magazine; Dec. 13, 2017.

(Continued)

Primary Examiner — Zhiyu Lu
(74) Attorney, Agent, or Firm — Bond, Schoeneck & King, PLLC

(57) ABSTRACT

A computer implemented tool and method for assisting users of earphones with selecting an earbud that will provide the best fit for the user. The tool collects image data of the user's ear, along with fit data associated with the user's experience (for example, comfort and/or stability data). The tool further includes a database of ear data and associated objective/subjective data that is utilized to calculate a fit value representative of the quality of fit based on the image data and the fit criteria data generated by the user. The tool will output at least one of an indication of fit level of the earphone in the user's ear based on the fit value, and a recommendation to the user for altering the selected earphone to improve fit of the earphone within the user's ear based on the fit value.

23 Claims, 6 Drawing Sheets

(56) References Cited

U.S. PATENT DOCUMENTS

| | | | | |
|---|---|---|---|---|
| 2011/0164128 | A1* | 7/2011 | Burgett | A61B 5/1076 348/77 |
| 2011/0290005 | A1* | 12/2011 | Hart | A61B 5/0073 73/37.9 |
| 2012/0242815 | A1* | 9/2012 | Burgett | H04R 1/1016 348/77 |
| 2013/0272530 | A1* | 10/2013 | Gauger, Jr. | H04R 1/10 381/59 |
| 2014/0247948 | A1* | 9/2014 | Goldstein | H04R 1/1016 381/58 |
| 2015/0092977 | A1* | 4/2015 | Silvestri | H04R 1/105 381/380 |
| 2015/0382123 | A1* | 12/2015 | Jobani | B29C 64/386 700/98 |
| 2017/0319381 | A1* | 11/2017 | Rogers | A61F 7/12 |
| 2018/0124495 | A1* | 5/2018 | Boesen | H04R 1/1041 |
| 2018/0136899 | A1* | 5/2018 | Risberg | G06F 3/165 |
| 2018/0322263 | A1* | 11/2018 | Hallock | G06F 21/316 |
| 2019/0253614 | A1* | 8/2019 | Oleson | H04N 5/23219 |

OTHER PUBLICATIONS

Image Classification with Keras and deep learning; Deep Learning, Keras, Tutorials; https://www.pyimagesearch.com/2017/12/11/image-classification-with-keras-and-deep-learning/; Adrian Rosebrock; Dec. 11, 2017.

Create your own Object Recognizer—ML on IOS; Interaction Designer & Techie in NYC; https://medium.com/@hunter.ley.ward/create-your-own-object-recognizer-ml-on-ios-7f8c09b461a1; Hunter Ward; Nov. 12, 2017.

The mind-blowing Creative SXFI Amp is here at last; https://www.cnet.com/reviews/creative-sxfi-amp-preview; Aloysius Low; Sep. 23, 2018.

* cited by examiner

COMPUTER-IMPLEMENTED TOOLS AND METHODS FOR DETERMINING OPTIMAL EAR TIP FITMENT

BACKGROUND

The present disclosure is directed generally to in-ear headphones and earbuds, and more particularly to a computer implemented tool that assists in selecting an ear tip for an earbud with the optimum fit for a user's ear.

The popularity of smart phones and portable audio players has led to in-ear headphones and earbuds becoming widely-used types of headphones. Earbuds are easily transportable and less bulky for users to carry and/or wear when using a mobile audio device. Although advancements have been made in ergonomics for earbuds, there is still room for improvement in fit for many users. While earbuds offer the potential for great comfort and sound quality for a variety of user's ears, they rely heavily on the earbud forming a good seal with the ear canal, amongst other anatomical and ergonomic considerations that factor into the best fit.

Accordingly, there is a need in the art for a tool that assists users in selecting the ear tip for an earbud that has the optimum fit for his or her ear.

SUMMARY

The present disclosure is directed to computer-implemented tools and methods for determining optimal earbud fitment.

In one aspect, a computer program product is provided that is encoded in a non-transitory computer readable storage medium having program instructions embodied therewith, the program instructions executable by a processor to cause the processor to perform a method for earphone fit detection. The computer program product includes: an image capture module adapted for capturing an image of the user's ear; an image processing module adapted to process the image and generating image data; a user data input module comprising a user interface and adapted to permit the user to input data corresponding to at least one fit criterion associated with earphone fit within the user's ear and generate at least one fit criteria data representative of the input data; a computation module adapted to compute a fit value representative of the quality of fit based on the image data and the at least one fit criterion data; and a result output module adapted to provide via the user interface at least one of: i) an indication of fit level of an earphone in the user's ear based on the fit value, and ii) a recommendation to the user for altering the earphone to improve fit of the earphone in the user's ear based on the fit value.

In an aspect, the computation module is a machine-learning computation module.

In an aspect, the fit value is a percent probability value.

In an aspect, the at least one fit criterion associated with earphone fit is selected from the group of: stability, comfort, pressure, angular velocity, and acoustics.

In an aspect, the acoustics criterion comprises a seal test in which a tone characterizes the quality of seal of the earphone in the user's ear.

In an aspect, the image capture module comprises an image alignment module that provides a signal to the user as to the whether the camera is accurately aligned with the user's ear.

In an aspect, the signal is selected from the group of an auditory signal or a vibratory signal.

In another aspect, a computerized system for earphone detection is provided. The computerized system includes: a processor comprising a non-transitory storage medium; an image capture module adapted to capture an image of an user's ear; an image processing module adapted to process the image and generate image data; a user data input module comprising a user interface and adapted to permit the user to input data corresponding to at least one fit criteria associated with earphone fit within the user's ear and generate at least one fit criteria data representative of the input data; a computation module adapted to compute a fit value representative of the quality of fit based on the image data and the at least one fit criteria data; and a result output module adapted to provide via the user interface at least one of: i) an indication of fit level of an earphone in the user's ear based on the fit value, and ii) a recommendation to the user for altering the earphone to improve fit in the user's ear based on the fit value.

In an aspect, the computation module is a machine-learning computation module.

In an aspect, the fit value is a percent probability value.

In an aspect, the at least one fit criterion associated with earphone fit is selected from the group of: stability, comfort, pressure, angular velocity, and acoustics.

In an aspect, the acoustics criterion comprises a seal test in which a tone characterizes the quality of seal of the earphone in the user's ear.

In an aspect, the image capture module comprises an image alignment module that provides a signal to the user as to the whether the camera is accurately aligned with the user's ear.

In an aspect, the signal is selected from the group of an auditory signal or a vibratory signal.

In an aspect, the computerized system further comprising a database comprising a plurality of data fields and in which the image data and fit criterion data are stored, and from which the computation module pulls data to perform its computation a percent probability.

In a further aspect, a method for earphone fit detection is provided. The method includes the steps of: capturing an image of a user's ear; processing the image of the user's ear and creating image data associated therewith; prompting the user to input data associated with at least one fit criteria relating to fit of the earphone and creating at least one fit criteria data associated therewith; computing a fit value representative of the quality of fit based on the image data and the at least one subjective criteria data; and outputting to a user interface at least one of: i) an indication of fit level of an earphone in the user's ear based on the fit value, and ii) a recommendation to the user for altering the earphone to improve fit of the earphone in the user's ear based on the fit value.

In an aspect, the step of capturing an image of the user's ear comprises providing a signal to the user in order to properly align a camera with the user's ear in response to a signal.

In an aspect, the step of providing a signal comprises providing an auditory tone sufficient for the user to hear.

In an aspect, the step of providing a signal comprises providing a vibratory signal sufficient for the user to feel.

In an aspect, the step of processing the image of the user's ear comprises using a machine learning algorithm.

In an aspect, the step of using a machine learning algorithm comprises providing an ear image classifier.

In an aspect, the step of prompting a user to input data associated with at least one s objective/subjective criteria comprises prompting a user to input data representative of the quality of at least one of the following criteria associated with the earphone: stability, comfort, pressure, angular velocity, and auditory.

In an aspect, the auditory criteria comprises the step of providing a sound tone that characterizes the quality of seal of the earphone in the user's ear.

These and other aspects of the invention will be apparent from the embodiments described below.

BRIEF DESCRIPTION OF THE DRAWINGS

The present disclosure will be more fully understood and appreciated by reading the following Detailed Description in conjunction with the accompanying drawings.

DETAILED DESCRIPTION

The present disclosure relates to computer implemented tools and methods that assist users of earbuds in selecting the ear tip for an earbud that will provide the best fit for the user's ear.

Figure 1:
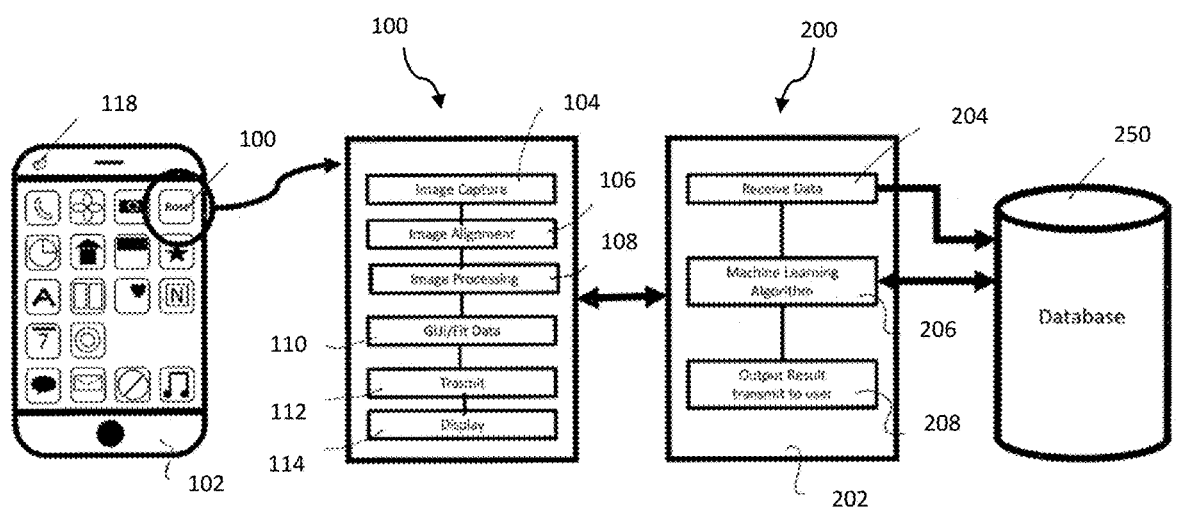
FIG. 1 is a block diagram of a system, in accordance with an embodiment.
Figure 3:
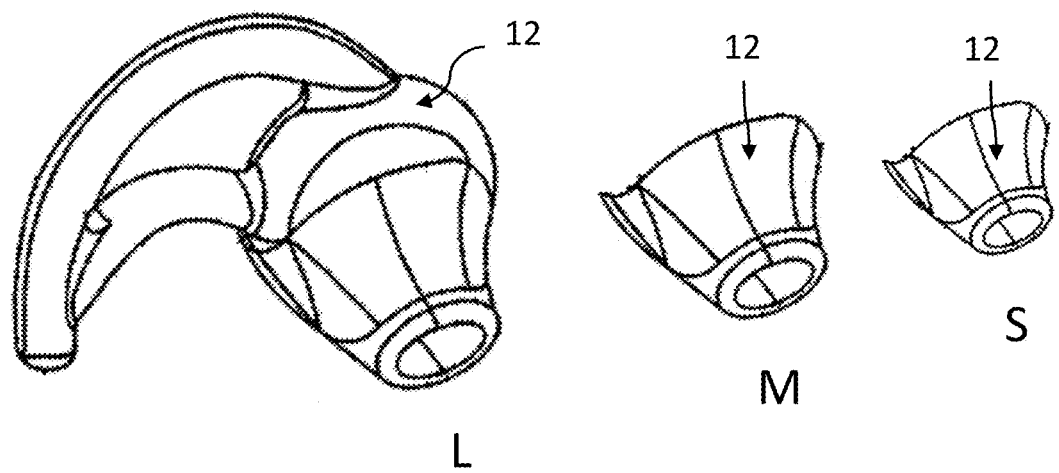
FIG. 3 is a perspective view of an earphone with three alternate size ear pieces, in accordance with an example.

Referring to FIG. 1, in one example, is a computer implemented system, designated generally by reference numeral 10, for assisting a user of an earbud 12 (one example of which is shown in FIG. 3) in determining the ear tip size that has the most optimum fit for the user. System 10 generally comprises: a software application 100 stored in the memory of a computing device (e.g., a smart phone, tablet, or similar device, or in the earbud 12 itself) 102, a database management system 200 that is stored in the non-transitory memory of a computer 202 having a processor, and a database 250. In operation, the user launches application 100 when wearing an earbud 12 with an associated ear tip to assess its fit and obtain a recommendation generated by the application as to whether a differently sized ear tip would be a better fit or a confirmation that the selected ear tip is a proper fit. As described below, application 100 will collect fit data, send that data to database management system 200, which in turn processes the data and determines the quality of fit which is then output to device 102. It is to be noted that while in one example, the software application 100 is stored in the memory of a computing device separate from the earbud 12, it is contemplated that the software application 100 could be stored in the memory of the earbud 12 without the need for a separate computing device.

Software application 100 generally comprises an image capture module 104, an image alignment module 106, an image data processing module 108, a user interface 110 that permits input (and storage) of user fit data (including, but not limited to, stability and comfort data,) and a transmit module 112 that will (1) send packetized image and fit data to database management system 200, and (2) receive the processed quality of fit data and sizing recommendation from database management system 200 which it then displays on the user interface 110 via display module 114. It is to be noted that while in one example, the software application 100 communicates with a remotely located computer 202 on which a database management system 200 is stored, it is contemplated that one computer program product could be contained in one processing device without the need for remote communications with an external computer for purposes of providing a user with an earbud fit recommendation.

Figures 2A, 2B, 2C, 2D:
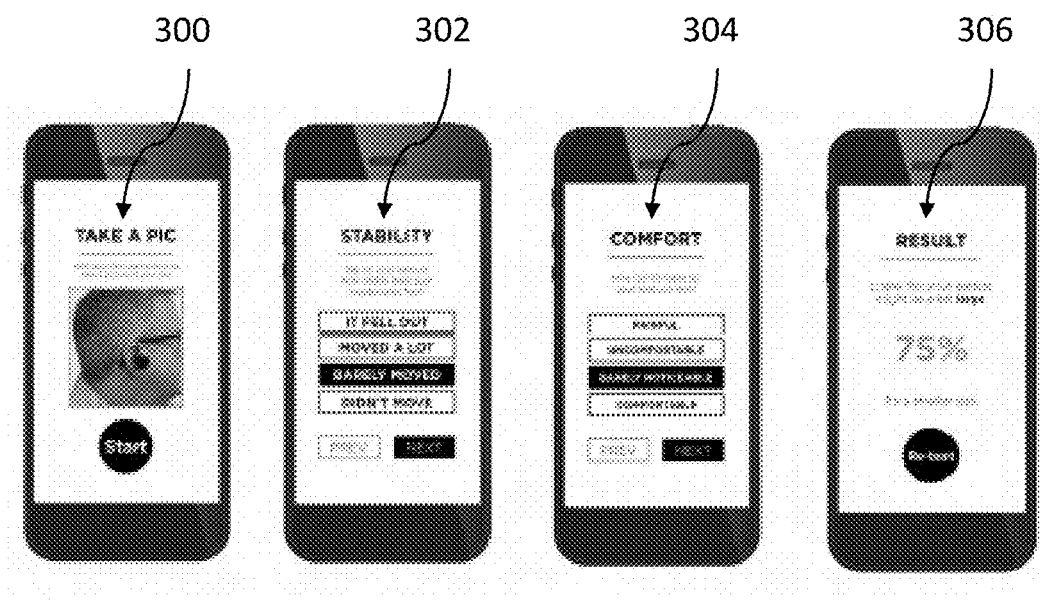
FIGS. 2A-2D are representations of graphical user interfaces (GUIs), in accordance with an example.

Image capture module 104 activates a camera 118 on device 102 which can then be operated by the user or a third party in a known manner to take a photo of the user's ear 14 after earbud 12 has been placed therein. As shown in FIG. 2A, program 100 will display on GUI 110 a prompt to take the picture and also a thumbnail image of the camera's image capture. Alternatively, a separate camera can be used to take a digital image of the user's ear and then that image file can be used within system 10. If the earbud 12 set has multiple sized ear tips (see, for example, FIG. 3, showing "S" for small, "M" for medium, and "L" for large ear tip options, although any number of earbuds may be provided), the user simply selects the size that appears to be the best fit for the user's ear. Once the earbud is in the user's ear 14, the user can then take a photo of his or her ear 14.

When using device 102 to take the image, image alignment module 106 will provide an indication of when the camera is focused appropriately on the ear; this indication can take the form of an audible signal, for example, with beeps indicating when the focus is getting better (e.g., faster beeps) or worse (e.g., slower beeps) and when the focus is sufficient (e.g., rapid beeps or a continuous tone). It should be noted that vibrations or other sensory signals aside from sound can be actuated by the user's device 102 to assist in properly focusing the camera on the ear. Once properly focused on the ear, the user can take the image of the ear.

Figure 4:
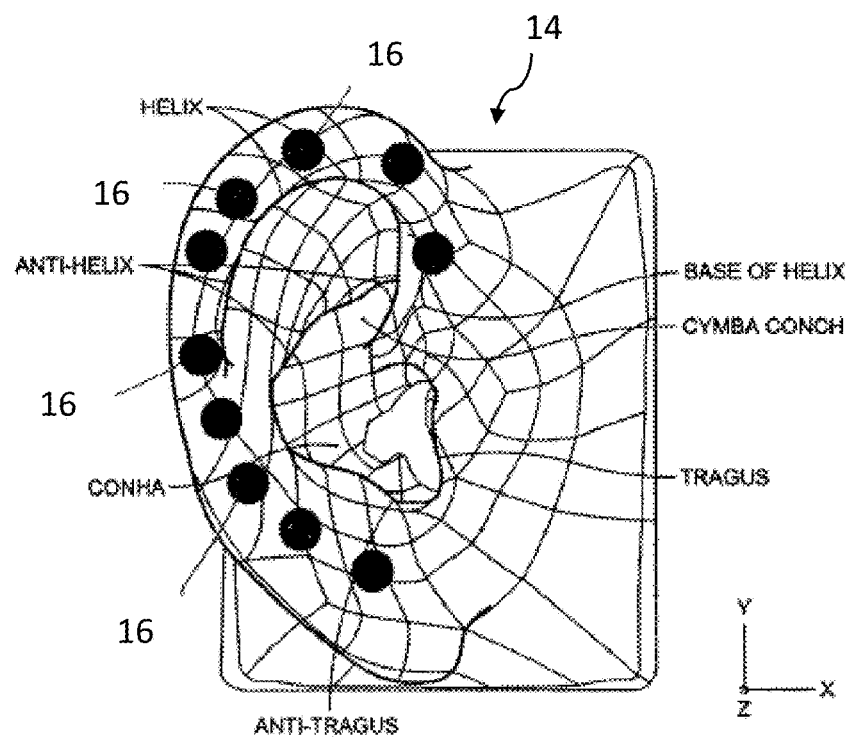
FIG. 4 is a schematic representation of an ear, in accordance with an example.
Figure 5:
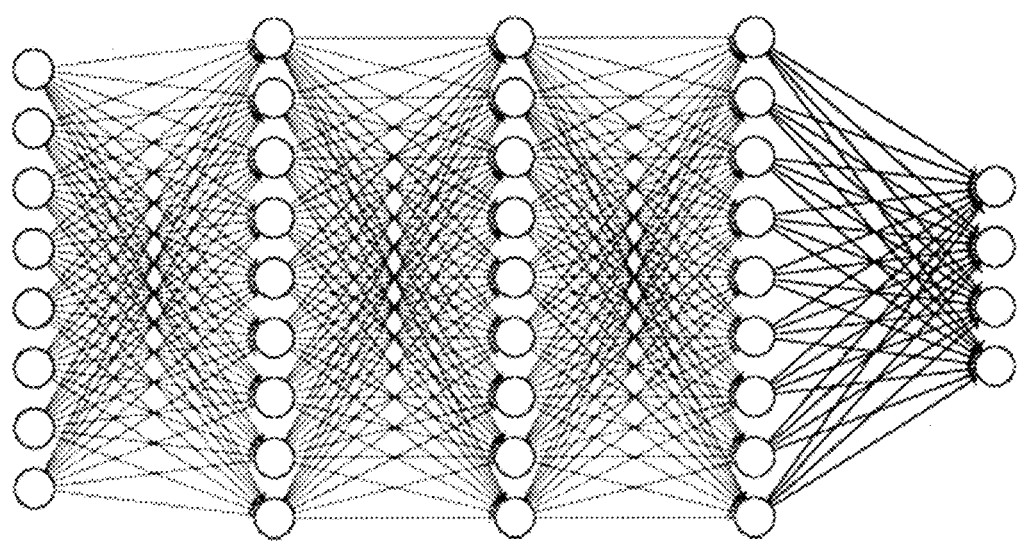
FIG. 5 is a schematic representation of a deep neural network, in accordance with an example.

The digital data of the captured image is then preprocessed by the image data processing module 108 to format the data for further processing and analysis. For example and as shown in FIG. 4, the image may be processed by creating points 16 along the ear 14 that can then be used in an image classifier (schematically represented as a deep neural network shown in FIG. 5) to classify the ear anatomy/shape/size and identify the parts of the ear (as labeled on FIG. 4). It is to be noted that other manners of processing the image data could be employed. For example, the image may be broken down into a matrix of pixel intensity values that can be analytically processed to create data representative of the ear that is useful in predicting earbud fit. Further, an image classifier that aligns the image along 1) certain points of the ear different from that illustrated, or 2) other features in the image (e.g., hair, facial structures) could also be employed.

As shown in FIG. 2, once the digital image data has been captured (using GUI 300, for example), the user may be presented with prompts on GUI 302 and GUI 304 as shown in FIGS. 2B-2C on which the user can indicate, among other things, the stability of the fit and the comfort of the fit. In some examples, as shown in FIGS. 2B-2C, the user may be presented with stability choices of whether the ear tip "fell out," "moved a lot," "barely moved," or "didn't move," for example, and the user may also be presented with comfort choices of whether the ear tip fit is "painful," "uncomfortable," "barely noticeable," or "comfortable," for example. Each of these choices is, of course, encoded with respective data and when the user indicates selections of comfort and fit (e.g., by touching the appropriate part of the GUI 302 or 304, or, alternatively, speaking words), the corresponding data, along with processed image data, will be transmitted 112 to the database-management system 200. As previously mentioned other or additional fit metrics could also be employed such as angular velocity, acoustic and/or pressure measurements. As an example, a good fit of earbud 12 occurs when rotated backward to "lock" in place; a gyroscope may be employed that senses angular velocity information about a given axis in order to determine the extent to which they are rotated. Conversely, loose-fitting earbuds 12 would appear to rotate and indicate change in angular velocity in multiple directions over time. This data can be fed into application 100 for processing. For simplicity the fit metric data will be referred to as "objective/subjective fit data".

Once the objective/subjective fit data and image data are transmitted from the user's device 102, such data is received 204 in database-management system 200, and then stored in database 250. A computation module/machine learning algorithm 206 determines the quality of fit based on the user's image data and image data stored in database 250. Module/algorithm 206 utilizes various conditions indicative of fit that can be determined based on the processed image. Applicant's U.S. Pat. No. 9,036,853, incorporated herein by reference in its entirety, describes the manner in which earbud 12 may be properly seated in a user's ear. For example, if the earbud 12 is pulling and bunching skin, as revealed by the image data, this would be indicative of a poor fit in the user's ear. Conversely, if the image data reveals that a portion of the tip (typically referred to as a retaining member) seating underneath the antihelix of the user's ear, and the extremity of the retaining member seating under the base of the helix of the user's ear, this is indicative of a good fit in the user's ear. Overall, the tip should fit closely against the concha and should not have portions sticking out unsecured as can be identified and determined by analyzing the image data. Other image data will be indicative of variously good or poor fits, and this image data coupled with the user objective/subjective data will permit calculation of how good or poor a fit the earphone achieves. Additionally, other information like (1) cord protrusion direction could be used (e.g., it is preferable that the cord lay parallel to the mandible and in between the temporomandibular joint and the earlobe and this could be determined through analysis of the image data), or (2) the expected location of hair/skin could be used to help determine if the ear tip is oriented properly.

From a technical standpoint, the reason these exemplars are indicative of poor fit from an image might be the location of high intensity black values (i.e., the cord) in the pixel matrix. For instance, it may be desirable to have high black values in bottom left quadrant of the matrix, not in the middle of the quadrant, for good fit. Or the tragus bunching causes shadows, which induces higher intensity black pixels, thereby indicating a poor fit. Of course there are numerous other examples of how the image data can be analyzed to assist in determining the quality of fit and those provided herein are for illustrative purposes only.

In addition, computation module/machine learning algorithm 206 uses the collected data in database 250 associated with image and objective/subjective fit data, thereby permitting more refined fit calculations to be made; the more data the database 250 contains, the better the fit calculations will be. In addition, the computation module/machine learning algorithm 206 will use the data in the database 250, along with the user's current data—including image and objective/subjective fit data—to predict the probability of a given earbud size. The more data the database 250 contains, the more accurate fit calculations and recommendations will be, as the machine learning model will be updated as more data are collected; retraining of models helps with both the user's individual fit as well as help to predict other users' fits. With the user's image, fit and stability data, the computation module/algorithm 206 will perform calculations and output/transmit 208 a fit indicator to the user's device; for example, a percent probability of the fit (such as, "the fit is 70% good"), and, if the fit is less than some threshold (e.g., worse than 50%,) providing a recommendation as to how to improve the fit (such as, for example, "try a smaller ear tip"). This output is displayed in GUI 306 on the user's device (see FIG. 2D).

Database 250 is configured to store a plurality of data fields, including, for example, device ID, customer ID (if known based on device ID or other collected data), metadata about the application 100 (e.g., version), metadata about the device 102 (e.g., operating system, version), comfort score (from user input), stability score (from user input), fit recommendation, seal information, among other fields. Thus, the image data and fit criteria data inputted using GUI 302 and 304 are stored in database 250, and the machine learning algorithm 206 pulls data therefrom to perform the fit value computation (as one example, percent probability of fit quality).

While the processing associated with computation module/machine learning algorithm 206 may be done using a deep neural network (see FIG. 5 for schematic representation), the processing could also be done in an alternative fashion. For example, the size of the user's ear could be extracted from the image data and a simple multinomial logistic regression may be employed where prediction as to best size is made using the ear size and subjective/objective data. Such a method would alleviate the processing required when using a deep neural network while still providing the benefit of a tool that provides the user with fit suggestions. Any number of machine learning algorithms (e.g., convolutional neural networks, logistic regression, etc.) and other image computation methods might be found to achieve better predictive accuracy.

If prompted to choose a different sized ear tip, the GUI 306 may include a button to re-test and run through the entire process again. The process is repeated until the user is satisfied with the results. It should be noted that additional data types could also be incorporated into the algorithm to further improve fitment. For example, acoustic and/or pressure data measurements could be taken and factored in to the fitment algorithm. The end result (the size that best fits the user) will be collected and stored in database 250. That size fit data can be used to train the model. If this same user chooses to try a new size in the future, the historical data can be used to retrain the fit models. It would also be beneficial from a user experience standpoint as the user can periodically be communicated with via in-app 100 notifications.

Figure 6:
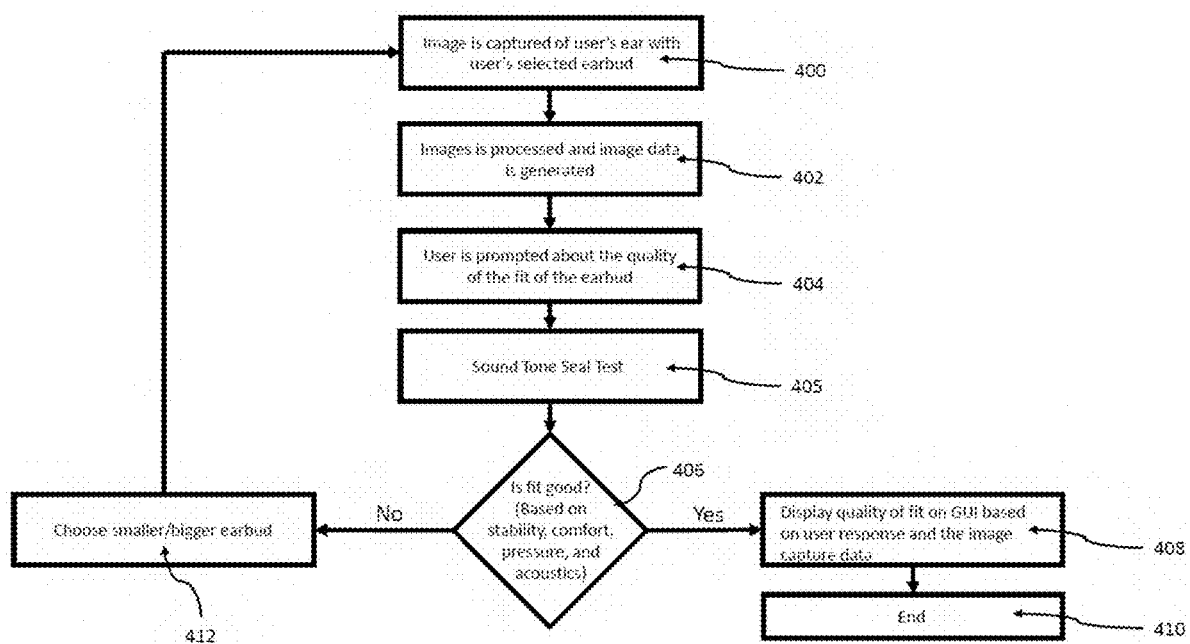
FIG. 6 is a flow chart, in accordance with an example.

FIG. 6 illustrates a flowchart describing a method for earphone fit detection. In step 400, an image is first captured of the user's ear with a user selected earbud. In step 402, program 100 then processes the image and generates image data. In step 404, the user is then prompted to enter data concerning objective/subjective criteria associated with the fit of the earbud. In step 406, once the image and objective/subjective data is transmitted to database management system 200, a computation module 206 determines whether the fit is good. In step 410, if the fit is good, the indication of the fit is displayed on GUI 114 in step 408 and then the program 100 ends. In step 412, if the fit was determined not to be good, a recommendation is displayed on GUI 114 to try a bigger or smaller earbud, and the method may repeat itself. As an optional step 405 (that would occur either before or after step 404; for purposes of illustration it is being shown as occurring after step 404), the earphone could be fit with device that would acoustically output a test sound into the user's ear canal by an acoustic driver, as is described in greater detail in Applicant's U.S. Pat. No. 9,002,023, hereby incorporated by reference in its entirety. A microphone acoustically coupled to the ear canal is employed to detect sounds within the user's ear canal that are indicative of the frequency response of the acoustic output of the acoustic driver to determine when the degree of sealing of the ear canal is sufficient to achieve a desired quality of frequency response. Data representative of this audio response may be utilized by the computation module/machine learning algorithm 206 by the calculating the transfer function between the in- and out-ear mics at specific frequencies to further assist in determining the quality of the fit.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, embodiments may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer program product encoded in a non-transitory computer readable storage medium having program instructions embodied therewith, the program instructions executable by a processor to cause the processor to perform a method for determining optimal earbud fitment, the computer program product comprising:
    an image capture module adapted for capturing an image of the user's ear with an earbud containing a first ear tip placed within the user's ear;
    an image processing module adapted to process the image and generating image data;
    a user data input module comprising a user interface and adapted to permit the user to input data corresponding to at least one fit criterion associated with ear tip fit of the earbud placed within the user's ear and generate at least one fit criterion data representative of the input data, wherein said at least one fit criterion comprises stability of the first ear tip within the user's ear or comfort of the first ear tip within the user's ear;
    a computation module adapted to compute a fit value representative of the quality of fit based on the image data and the at least one fit criterion data; and
    a result output module adapted to provide via the user interface: i) an indication of fit level of the first ear tip in the user's ear based on the fit value, and ii) a recommendation to the user for altering the earbud to improve fit of the earbud in the user's ear based on the fit value, wherein the recommendation comprises prompting the user to replace the first ear tip with a second ear tip.

2. The computer program product of claim 1, wherein the computation module is a machine-learning computation module.

3. The computer program product of claim 1, wherein the fit value is a percent probability value.

4. The computer program product of claim 1, wherein said at least one fit criterion further comprises pressure, angular velocity, or acoustics measurements of the earbud within the user's ear.

5. The computer program product of claim 4, wherein said at least one fit criterion comprises acoustics, and wherein said acoustics criterion comprises a seal test in which a tone characterizes the quality of seal of the earbud in the user's ear.

6. The computer program product of claim 1, wherein said image capture module comprises an image alignment module that provides a signal to the user as to the whether the camera is accurately aligned with the user's ear.

7. The computer program product of claim 6, wherein said signal is selected from the group of an auditory signal or a vibratory signal.

8. A computerized system for determining optimal earbud fitment, comprising:
    a processor comprising a non-transitory storage medium;
    an image capture module adapted to capture an image of a user's ear with an earbud containing a first ear tip placed within the user's ear;
    an image processing module adapted to process the image and generate image data;
    a user data input module comprising a user interface and adapted to permit the user to input data corresponding to at least one fit criterion associated with ear tip fit of the earbud placed within the user's ear and generate at least one fit criterion data representative of the input data, wherein said at least one fit criterion comprises stability of the first ear tip within the user's ear or comfort of the first ear tip within the user's ear;
    a computation module adapted to compute a fit value representative of the quality of fit based on the image data and the at least one fit criterion data; and
    a result output module adapted to provide via the user interface: i) an indication of fit level of the first ear tip in the user's ear based on the fit value, and ii) a recommendation to the user for altering the earbud to improve fit of the earbud in the user's ear based on the fit value, wherein the recommendation comprises prompting the user to replace the first ear tip with a second ear tip.

9. The computerized system of claim 8, wherein the computation module is a machine-learning computation module.

10. The computerized system of claim 8, wherein the fit value is a percent probability value.

11. The computerized system of claim 10, wherein said fit criterion further comprises pressure, angular velocity, or acoustics measurements of the earbud within the user's ear.

12. The computerized system of claim 11, wherein said at least one fit criterion comprises acoustics, and wherein said acoustics criterion comprises a seal test in which a tone characterizes the quality of seal of the earbud in the user's ear.

13. The computerized system of claim 8, wherein said image capture module comprises an image alignment module that provides a signal to the user as to the whether the camera is accurately aligned with the user's ear.

14. The computerized system of claim 8, further comprising a database comprising a plurality of data fields and in which the image data and objective/subjective criteria data are stored, and from which the computation module pulls data to perform its computation a percent probability.

15. A method for determining optimal earbud fitment, comprising the steps of:
    capturing an image of a user's ear with an earbud containing a first ear tip placed within the user's ear;
    processing the image of the user's ear and creating image data associated therewith;
    prompting the user to input data associated with at least one fit criterion relating to fit of the first ear tip of the earbud placed within the user's ear and creating at least one fit criterion data associated therewith, wherein said at least one fit criterion comprises stability of the first ear tip within the user's ear or comfort of the first ear tip within the user's ear;
    computing a fit value representative of the quality of fit based on the image data and the at least one fit criterion data; and
    outputting to a user interface: i) an indication of fit level of the first ear tip in the user's ear based on the fit value, and ii) a recommendation to the user for altering the earbud to improve fit of the earbud in the user's ear based on the fit value, wherein the recommendation comprises prompting the user to replace the first ear tip with a second ear tip.

16. The method of claim 15, wherein the step of capturing an image of the user's ear comprises providing a signal to the user in order to properly align a camera with the user's ear in response to a signal.

17. The method of claim 16, wherein the step of providing a signal comprises providing an auditory tone.

18. The method of claim 16, wherein the step of providing a signal comprises providing a vibratory signal.

19. The method of claim 15, wherein the step of processing the image of the user's ear comprises using a machine learning algorithm.

20. The method of claim 19, wherein the step of using a machine learning algorithm comprises providing an ear image classifier.

21. The method of claim 15, wherein the at least one fit criterion further comprises pressure, angular velocity, or auditory measurements of the earbud within the user's ear.

22. The method of claim 21, wherein said at least one fit criterion comprises auditory, and wherein the auditory criteria comprises the step of providing a sound tone that characterizes the quality of seal of the earbud in the user's ear.

23. The computer program product of claim 1, wherein the fit value is further based on a cord protrusion direction of the earbud within the user's ear.

* * * * *